United States Patent
Ross et al.

(10) Patent No.: US 6,988,372 B2
(45) Date of Patent: Jan. 24, 2006

(54) ICE CREAM MACHINE INCLUDING A CONTROLLED INPUT TO THE FREEZING CHAMBER

(75) Inventors: Harold F. Ross, Bark River, MI (US); Daniel L. Dorn, Bark River, MI (US)

(73) Assignee: Ross's Manufacturing, LLC, Escanaba, MI (US)

( * ) Notice: Subject to any disclaimer, the term of this patent is extended or adjusted under 35 U.S.C. 154(b) by 0 days.

(21) Appl. No.: 10/654,371

(22) Filed: Sep. 3, 2003

(65) Prior Publication Data

US 2004/0045310 A1    Mar. 11, 2004

Related U.S. Application Data

(63) Continuation of application No. 10/075,089, filed on Feb. 12, 2002, now Pat. No. 6,651,448.

(51) Int. Cl.
*A23G 9/00* (2006.01)
(52) U.S. Cl. ............................... 62/69; 62/342
(58) Field of Classification Search .................. 62/68, 62/342; 366/131, 132
See application file for complete search history.

(56) References Cited

U.S. PATENT DOCUMENTS

| | | |
|---|---|---|
| 967,503 A | 8/1910 | Davis |
| 1,698,941 A | 1/1929 | Davenport |
| 1,767,857 A | 6/1930 | Sawyer |
| 1,769,113 A | 7/1930 | Davenport |
| 1,791,041 A | 2/1931 | Sawyer |
| 1,818,364 A | 6/1931 | Turnbow |
| 1,907,641 A | 5/1933 | Askin |
| 1,911,464 A | 5/1933 | Pearson |
| 2,070,729 A | 2/1937 | Harsch et al. |
| 2,156,096 A | 4/1939 | Robinson |
| 2,349,367 A | 5/1944 | Muffly |
| 2,515,722 A | 7/1950 | Maranz |
| 2,702,460 A * | 2/1955 | Gaugler ............... 62/503 |
| 2,737,024 A * | 3/1956 | Swenson ............... 62/125 |
| 2,772,784 A | 12/1956 | Cyphers et al. |
| 3,196,627 A | 7/1965 | Swenson |
| 3,227,904 A | 1/1966 | Levin |
| 3,229,647 A | 1/1966 | Von Drachenfels et al. |
| 3,255,815 A | 6/1966 | Smith |
| 3,264,836 A | 8/1966 | Miller et al. |
| 3,317,198 A | 5/1967 | Phelan et al. |
| 3,803,870 A | 4/1974 | Conz |
| 3,898,868 A | 8/1975 | Erickson |
| 3,928,646 A | 12/1975 | Hartley |
| 3,952,534 A | 4/1976 | Jacobs |
| 3,961,494 A | 6/1976 | Schaefer et al. |
| 4,019,689 A | 4/1977 | Hunt |
| 4,052,180 A | 10/1977 | Erickson |
| 4,094,168 A | 6/1978 | Hamner et al. |
| 4,162,127 A | 7/1979 | Wakeman et al. |

(Continued)

FOREIGN PATENT DOCUMENTS

WO   WO 99/65325 A1   12/1999

*Primary Examiner*—William E. Tapolcai
(74) *Attorney, Agent, or Firm*—Foley & Lardner LLP

(57) ABSTRACT

An ice cream machine for cooling liquid ice cream into frozen ice cream includes an evaporator system with a secondary evaporator. The evaporator system includes a cooling chamber having an ice cream input and an ice cream output. A valve can be placed at the ice cream input to achieve dry freeze operation. The valve can prevent the cooling chamber from being completely filled.

21 Claims, 7 Drawing Sheets

U.S. PATENT DOCUMENTS

| | | |
|---|---|---|
| 4,275,567 A | 6/1981 | Schwitters |
| 4,332,145 A | 6/1982 | Yuhasz et al. |
| 4,383,417 A | 5/1983 | Martineau |
| 4,412,428 A | 11/1983 | Giannella et al. |
| 4,463,572 A | 8/1984 | Brown, Jr. |
| 4,502,617 A | 3/1985 | Stecker et al. |
| 4,537,045 A | 8/1985 | Mayer |
| 4,625,525 A | 12/1986 | Bradbury et al. |
| RE32,360 E | 2/1987 | Martineau |
| 4,669,274 A * | 6/1987 | Huang ......................... 62/342 |
| 4,703,628 A | 11/1987 | Togashi et al. |
| 4,758,097 A | 7/1988 | Iles, Sr. |
| 4,878,760 A | 11/1989 | Newton et al. |
| 5,016,446 A | 5/1991 | Fiedler |
| 5,158,506 A | 10/1992 | Kusano et al. |
| 5,201,861 A | 4/1993 | Menzel |
| 5,245,833 A | 9/1993 | Mei et al. |
| 5,653,118 A | 8/1997 | Cocchi et al. |
| 5,706,720 A | 1/1998 | Goch et al. |
| 5,755,106 A | 5/1998 | Ross |
| 5,816,455 A | 10/1998 | Alpers et al. |
| 5,916,248 A | 6/1999 | Bravo |
| 5,934,516 A | 8/1999 | Strycharske et al. |
| 6,082,120 A | 7/2000 | Hoffmann et al. |
| 6,119,472 A | 9/2000 | Ross |
| 6,253,573 B1 | 7/2001 | Schwitters et al. |
| 6,370,892 B1 | 4/2002 | Ross |
| 2001/0037656 A1 | 11/2001 | Ross |
| 2003/0061830 A1 | 4/2003 | Ross |
| 2003/0150227 A1 | 8/2003 | Ross et al. |
| 2003/0150236 A1 | 8/2003 | Ross et al. |

* cited by examiner

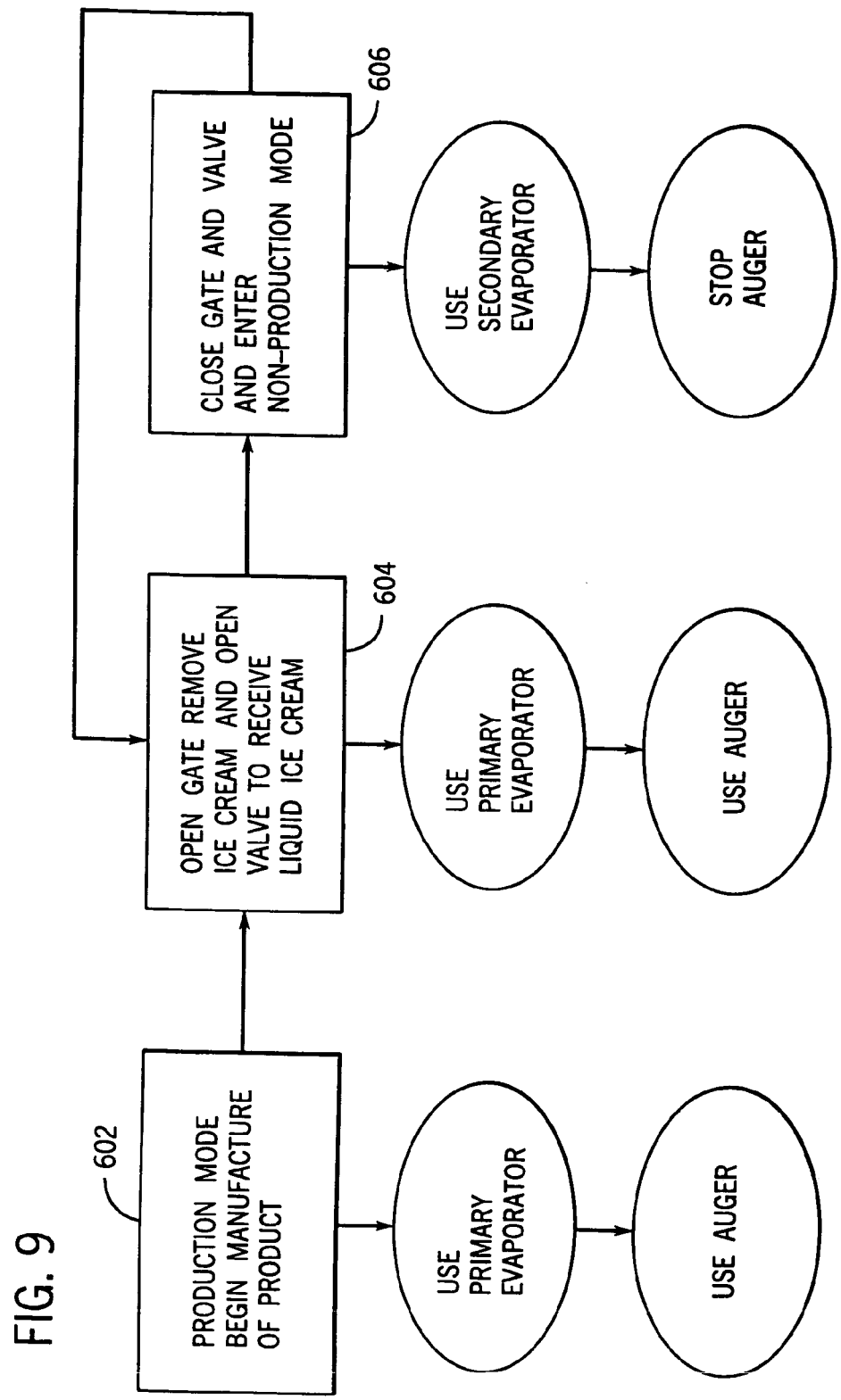

ICE CREAM MACHINE INCLUDING A CONTROLLED INPUT TO THE FREEZING CHAMBER

CROSS REFERENCE TO RELATED PATENT APPLICATIONS

The present application is a continuation of U.S. patent application Ser. No. 10/075,089, filed by Ross et al. on Feb. 12, 2002. The present application is related to U.S. patent application Ser. No. 09/639,062 filed Aug. 15, 2000 entitled, "Batch Process and Apparatus Optimized to Efficiently and Evenly Freeze Ice Cream", which is a continuation-in-part of U.S. patent application Ser. No. 09/234,970, filed by Ross on Jan. 21, 1999, now U.S. Pat. No. 6,119,472, which is a continuation-in-part of U.S. patent application Ser. No. 09/083,340, filed by Ross on May 22, 1998, now U.S. Pat. No. 6,101,834, which is a continuation-in-part of U.S. patent application Ser. No. 08/869,040, filed Jun. 4, 1997, now U.S. Pat. No. 5,755,106, which was a continuation of U.S. patent application Ser. No. 08/602,302, filed Feb. 16, 1996, abandoned. The above-referenced U.S. patent application Ser. No. 09/639,062, U.S. Pat. No. 6,101,834, U.S. Pat. No. 6,119,472, and U.S. Pat. No. 5,755,106 are incorporated herein by reference.

The present application is also related to U.S. application Ser. No. 10/074,268, entitled "Ice Cream Machine Including a Secondary Cooling Loop" assigned to the assignee of the present application, filed on an even date herewith by Ross et al.

FIELD OF THE INVENTION

The present invention generally relates to refrigeration or cooling systems. More particularly, the present invention relates to an evaporator design for refrigeration or cooling systems or to a mode of operation for an ice cream machine.

BACKGROUND OF THE INVENTION

Ice cream or frozen custard machines, as well as other systems for cooling or freezing food stuffs, condiments, or other materials, typically include an evaporator situated proximate the material being chilled. For example, in ice cream machines and soft serve machines, liquid ice cream (e.g., the mix) is typically inserted in a freezing chamber or barrel associated with the evaporator and is removed from the barrel as solid or semi-solid ice cream. The evaporator removes heat from the freezing chamber as a liquid refrigerant, such as, FREON®, ammonia, R-404a, HP62, or other liquid having a low boiling point, changes to vapor in response to the heat from the liquid ice cream. Typically, the evaporator is partially filled with vapor as the liquid refrigerant boils (e.g., becomes vapor) in the evaporator.

Quick freezing of liquid ice cream and high capacity are desirous features of ice cream makers. In addition, custard or ice cream quality and efficient manufacture of such custard or ice cream are dependent upon maintaining a constant evaporator temperature (e.g., constant barrel temperature). The barrel temperature must be kept in a proper range for making ice cream. If the custard or ice cream is allowed to become too cold, the mix or liquid ice cream in the evaporator becomes highly viscous and can block the travel of the ice cream through the barrel. Blockage of the barrel in the freezing process is commonly known as "freeze up". If the ice cream or custard is allowed to become warm, its texture is adversely affected.

Maintaining the temperature of the barrel at a constant level is particularly difficult as ice cream flow rates through the machine vary and change the cooling load on the evaporator. For example, more heat dissipation is required as more ice cream is produced (i.e., the flow rate is increased). Additionally, if the barrel temperature is too low, refrigerant flood-back problems can adversely affect the operation of the compressor. For example, if the refrigerant is not fully evaporated as it reaches the compressor, the liquid refrigerant can damage the compressor.

Problems associated with temperature consistency are exacerbated during periods of non-production (e.g., an idle mode, a period of slow sales, a hold mode, etc.). Generally, ice cream machines, particularly soft serve machines, can experience non-production modes, periods of little or low production operation or a "hold" mode. During this mode, liquid ice cream and frozen ice cream product remain in the barrel (the cooling chamber) awaiting to be processed. However, due to the low demand for ice cream, ice cream is not removed from the barrel. The ice cream in the barrel can be subjected to temperature fluctuations during these periods of non-production due to heat infiltration.

Heretofore, ice cream machines have required that the refrigeration system (the compressor) be cycled on and off to maintain the ice cream in the barrel at the appropriate temperature. Such conventional systems have been unable to accurately maintain the barrel temperature at a proper and consistent temperature. For example, the fairly large compressors associated with the ice cream machine cool (e.g., overcool) the barrel down and then allow it to warm back up before the compressor is engaged to cool the barrel. The temperature within the barrel fluctuates according to a sawtooth wave. The gradual freezing and thawing causes the product to break down such that texture of the product becomes more grainy and less desirable to the taste.

Further, conventional systems have allowed the liquid ice cream mix to have constant access to the barrel. Generally, conventional systems have included a liquid ice cream reservoir connected to the evaporator via an aperture. The allowance of liquid ice cream to enter the barrel during non-production times contributes to the warming of the ice cream in the barrel, thereby affecting the quality of the ice cream within the barrel when liquid ice cream is allowed to fill the barrel, the liquid ice cream can become frozen against the barrel, thereby reducing the freezing efficiency of the barrel.

Further, conventional systems have allowed the ice cream product to be periodically and automatically mixed (i.e., beaten) in the evaporator during non-production modes or slow sales periods. Overbeating of the ice cream product results in poor ice cream texture and less desirable taste.

Thus, there is a need for an ice cream machine which can operate in a hold mode and not allow the barrel temperature to fluctuate drastically. Further still, there is a need for a process and a machine which can more efficiently and more evenly cool ice cream. Even further still, there is a need for a frozen machine which utilizes a barrel and maintains the ice cream product at a consistent temperature.

Yet even further still, there is a need for a process or method which does not allow liquid ice cream to affect the temperature in the barrel while in a hold or non-production mode. Yet even further, there is a need for an ice cream machine which does not allow the chamber wall to become coated with ice cream. Further still, there is a need for an evaporator and a control system for an ice cream machine which prevents breakdown of the ice cream product during slow sales periods. Further, there is a need for a hold mode for an ice cream machine which requires little or no bearing of the ice cream product.

SUMMARY OF THE INVENTION

An exemplary embodiment relates to an ice cream making system. The ice cream making system includes an evaporator including a cooling chamber and at least one valve. The cooling chamber has an ice cream input and an ice cream output. The at least one valve is provided at the ice cream input and is capable of preventing ice cream from entering the cooling chamber.

Yet another embodiment relates to an evaporator for an ice cream making system. The evaporator includes an interior surface defining a cooling chamber for chilling a product, an evaporator chamber and a valve. The cooling chamber has an ice cream input and an ice cream output. The evaporator chamber surrounds the cooling chamber. The valve is in series with the ice cream input.

Yet another embodiment relates to a method of manufacturing ice cream. The method utilizes an ice cream machine having a cooling chamber. The method includes providing liquid ice cream contents into the cooling chamber through a valve. The valve prevents the cooling chamber from being more than 75% filled during a hold mode. The method also includes cooling the ice cream contents in the cooling chamber and removing frozen ice cream from the cooling chamber. Still another embodiment relates to ice cream machine including an evaporator having a cooling chamber. The cooling chamber has an ice cream input and an ice cream output. The ice cream machine also includes means for restricting access through the ice cream input to the cooling chamber.

BRIEF DESCRIPTION OF THE DRAWINGS

The invention will hereafter be described with reference to the accompanying drawings, wherein like reference numerals denote like elements, and:

FIG. 9 is a flow diagram showing exemplary operation of the systems illustrated in FIGS. 1 and 2.

DETAILED DESCRIPTION OF THE PREFERRED EXEMPLARY EMBODIMENT OF THE PRESENT INVENTION

Figure 1:
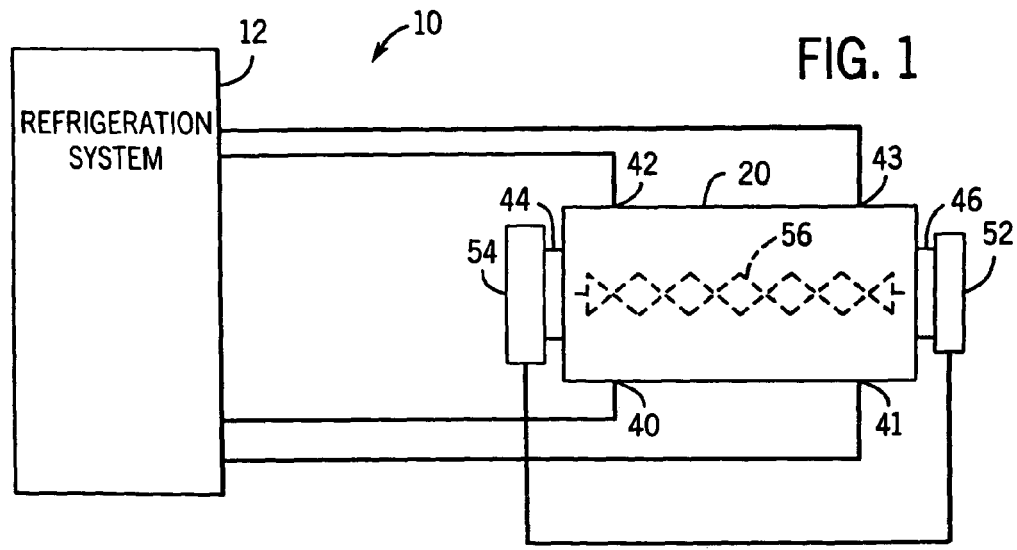
FIG. 1 is a schematic diagram illustrating an advantageous ice cream making system according to an exemplary embodiment.

A soft serve, frozen custard, or ice cream machine or making system 10 is diagrammatically shown in FIG. 1. Ice cream machine 10 includes a cooling or refrigeration system 12 and an evaporator 20. Refrigeration system 12 can include any number of components for providing and processing liquid refrigerant to and receiving and processing a vapor refrigerant from evaporator 20. For example only, system 12 can include an expansion device, such as, a valve, a shut-off device, such as, a solenoid valve, a sight glass, a filter, a condenser, a compressor, an accumulator, and a valve. Although not limited to such systems, system 12 can utilize any of the components or systems described in U.S. Pat. Nos. 6,119,472, 6,101,834, 5,755,106, and application Ser. No. 09/639,062.

Evaporator 20 can be a system including a number of components on a single integral unit. For example only, evaporator 20 can include a cylindrical cooling tank, a secondary evaporator, and an auxiliary tank. Evaporator 20 can have a design similar to any of the evaporators discussed in U.S. Pat. Nos. 6,119,472, 6,101,834, 5,755,106, and application Ser. No. 09/639,062. Evaporator 20 is modified to include a secondary evaporation or another jacket for maintaining the temperature within evaporator 20 during non-production modes.

Evaporator 20 includes a first refrigerant input 40, a first refrigerant output 42, a liquid ice cream input 44, and an ice cream output 46. Evaporator 20 further includes a second refrigerant input 41 and a second refrigerant output 43. Refrigeration system 12 utilizes refrigerant input 40 and refrigerant output 42 to provide primary cooling for ice cream making system 10. Refrigerant input 40 and output 42 are in fluid communication with an evaporator chamber which surrounds a cooling chamber between ice cream input 44 and ice cream output 46. Output 42 can also be coupled to an auxiliary evaporator tank as described below with reference to FIG. 4.

Figure 3:
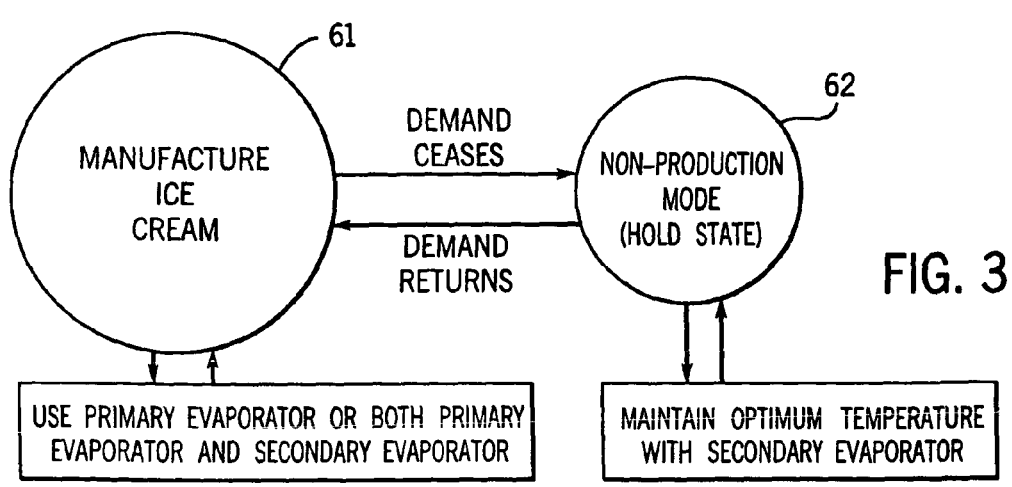
FIG. 3 is a state diagram showing the operation of the systems illustrated in FIGS. 1 and 2.

With reference to FIG. 3, system 10 can manufacture ice cream or other frozen or semi-frozen food stuff in an operational mode 61. Ice cream can be manufactured utilizing a quick draw gate which creates ice cream whenever gate 52 is opened. During the manufacture of ice cream in mode 61, system 10 uses the primary cooling loop associated with input 40 and output 42. Alternatively, both the primary evaporator chamber and the secondary evaporator chamber (the secondary loop associated with input 41 and output 43) can be utilized.

When demand ceases, system 10 operates in a non-production mode 62. When demand returns, such as, when gate 52 is opened, system 10 returns to mode 61. Various sub-states or intervening states may occur between modes 61 and 62. For example, system 10 may not reach a non-production mode until the temperature within evaporator 20 reaches a particular level. Further, system 10 may be maintained in mode 61 until ice cream is not demanded for a period of time or until the temperature within evaporator 20 falls below a predetermined level after gate 52 is closed.

Advantageously, when system 10 operates in a non-production mode 62, it maintains the contents within evaporator 20 at a consistent temperature. Non-production mode 62, such as, an idle mode, or hold mode, refers to any period of time at which system 10 is not allowing ice cream to exit outputs 46 and yet ice cream product, whether or not completed or partially completed, remains in the freezing chamber of evaporator 20. The non-production mode can be utilized during periods of slow sales, when system 10 is idling between business hours (system 10 is idle for the night), etc.

In mode 62, refrigeration system 12 (FIG. 1), second refrigerant input 41 and second refrigerant output 43 maintain the interior cooling chamber of evaporator 20 at a consistent temperature. A secondary evaporator chamber is in fluid communication with input 41 and output 43. The secondary evaporator can encompass the primary evaporator chamber associated with input 40 and output 42.

The secondary evaporator preferably cools refrigerant trapped within the primary evaporator chamber, thereby acting as a second loop for cooling the primary refrigeration loop (the primary evaporator chamber). The trapped refrigerant within the primary evaporator surrounding the interior freezing chamber provides a stabilizing effect to hold and transfer temperature into the ice cream product held within the interior cooling chamber.

The refrigeration system 12 can utilize a primary compressor system and/or a secondary compressor system to provide refrigerant to the secondary evaporator. The secondary evaporator can be any or any combination of wrapped tubing, refrigeration jackets, and/or chambers. By maintaining the temperature at a more consistent temperature via refrigerant input 41 and refrigerant output 43, fluctuations in product temperature that can break down the ice cream and cause poor tasting ice cream are reduced. Further, product which has been left in the interior chamber for prolonged period of time is not wasted.

In one embodiment in which system 10 is configured as a soft serve ice cream machine, ice cream can be stored in the interior chamber within the barrel to keep it at the appropriate temperature between draws (e.g., servings). This advantageously allows ice cream to be served directly from evaporator 20 and eliminates the need for a dipping cabinet or other refrigeration unit for storing post manufactured ice cream. In this way, ice cream directly from the machine can be immediately served.

Applicant has found that by using a secondary cooling loop (e.g., secondary evaporator between input 41 and output 43), a consistent temperature can be provided in the interior chamber for long periods of time, such as, 60 hours. Accordingly, over long periods of time in non-production mode 62, the contents of the interior chamber do not need to be emptied and discarded due to on/off cycling. Rather, the contents can remain in evaporator 20 and be served accordingly. Further, since ice cream is not discarded, the interior chamber does not need to be cleaned after each entry into non-production mode 62.

According to one embodiment, at least one non-positive shutting control valve can be provided at input 40 to the primary evaporator. Liquid refrigerant is allowed to enter through the control valve to evaporator 20 (to the first cooling loop of evaporator 20). Allowing liquid refrigerant through input 40 in a metered but continuous fashion allows the liquid in the first stage loop to become saturated and subcooled. The liquid refrigerant completely fills the first stage loop and its presence acts as a stabilizing effect on temperature swings by means of thermal mass and thermal transfer.

According to another preferred embodiment, machine 10 can control auger 56 at different speeds during different periods of production. During production of ice cream (mode 61), machine 10 allows auger 56 to spin at a first speed (slow rpm) for production. When gate 52 is open, auger 56 spins at a second speed (a faster rpm) for discharging product through output 46. Various speeds can be chosen in accordance with design criteria to achieve highest production and optimal discharge rates.

System 10 further includes an advantageous ice cream transport control system. Ice cream is provided at ice cream output when a gate 52 is opened. Gate 52 is preferably linked to a valve 54 at ice cream input 44. Accordingly, when gate 52 is opened and closed, valve 54 is also open and closed. A delay for opening and closing valve 54 after gate 52 is opened can also be implemented by a control mechanism. In one embodiment, once opened, valve 54 can remain open until a particular capacity is reached in the cooling chamber.

Valve 54 can be controlled by mechanical linkage coupled to gate 52. Alternatively, an electronic control system can be utilized to control the opening of valve 54 with respect to gate 52.

Liquid ice cream is not allowed to enter the interior chamber and warm the contents of interior chamber when gate 52 is closed and system 10 is in a hold or non-production mode 62 (FIG. 3). In this way, valve 54 only allows an appropriate amount of mix to be in the interior chamber according to dry barrel technology. Further still, applicants have found that by limiting the quantity of material within the interior chamber, system 10 operating as a direct draw machine produces higher quality fresh ice cream having a superior taste. Product is produced with low overrun, thereby operating with results similar to a standard machine.

In another preferred embodiment, machine 10 utilizes valve 54 to meter and limit the amount of product stored in evaporator 20. By eliminating the amount of products stored in evaporator 20, the surface area available for production of product is increased, thereby increasing the speed at which ice cream is frozen. Faster freezing generally results in a better ice cream product texture.

As discussed above, since the amount of custard stored in the barrel of evaporator 20 is minimized (the heat exchange area is maximized), a more effective surface area for production is achieved. This is a significant advantage over conventional soft serve ice cream machines in which liquid ice cream product fills evaporator 20 (e.g., the freezing chamber is flooded). With such conventional systems, the inner wall of the chamber is coated with frozen product and becomes less effective for freezing the remaining product in the chamber of new product.

According to another embodiment, the dry barrel technology discussed above can be implemented via valve 54. Valve 54 can be a metering valve controlled by an actuator. An electric control circuit coupled to a sensor can ensure that actuator restricts the chamber to be less than half-filled during non-production modes. Preferably, the freezing chamber in evaporator 20 is 25% to 50% filled with pre-made product. A conventional machine typically allows of the chamber to be 75 to 100% filled with pre-made product. The metering valve is controlled to be positively shut when gate 52 is shut and ice cream is not drawn from evaporator 20. This allows the barrel to store pre-made product but only have 25–50% of the barrel full of pre-made product, thereby resulting in faster freezing of new product.

In addition, a control circuit or system is preferably provided which prevents an auger 56 within the interior chamber from overbeating the contents of interior chamber when gate 52 is closed. Embodiments of control systems mechanisms and schemes for system 10 are described with reference to FIG. 8. The control schemes monitor the operation of auger 56 and valve 54.

Figure 2:
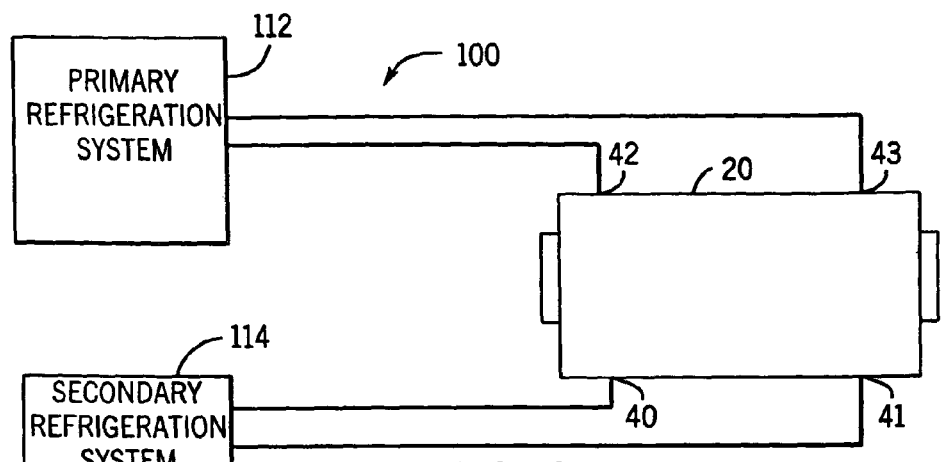
FIG. 2 is a schematic diagram illustrating another advantageous ice cream making system according to another exemplary embodiment.

With reference to FIG. 2, an ice cream making system 100 is substantially similar to ice cream making system 10. However, refrigeration system 12 of FIG. 1 includes a primary refrigeration system 12 and a secondary refrigeration 114. Systems 112 and 114 can share components. Preferably, systems 112 and 114 have separate compressors. Alternatively, system 100 can include three or more refrigeration systems if three or more evaporator chambers or coils are utilized by evaporator 20.

Although evaporator 20 is shown as having four separate interfaces (inputs 40 and 41 and outputs 42 and 43) in FIGS. 1 and 2, the interfaces can be integrated together and/or separately divided within evaporator 20. For example, a gate or valve can be used to divert refrigerant from a single supply line to input 40 and input 41 located within evaporator 20. Similar systems can be designed for outputs 42 and 43.

Primary refrigeration system 112 preferably includes a relatively large compressor for use in making ice cream during normal operating temperatures. A smaller compressor can be utilized in secondary refrigeration system 114. The smaller compressor can more efficiently provide limited amounts of refrigerant to evaporator 20. Preferably, the secondary compressor is rated between ¼ and ¾ horsepower, depending on design. In a preferred embodiment, a ⅓ horsepower rating is utilized. The primary refrigeration system 112 can utilize a compressor with a 1½ to 3 horsepower or more rating. In a preferred embodiment, a compressor rated at a ½ horsepower rating is utilized. The use of the smaller compressor during mode 62 (FIG. 3) reduces energy consumption. Limiters may be used to make the capacity of a 1½ to 3 HP compressor act like smaller unit.

In an alternative embodiment, a separate condenser unit can also be provided for the secondary evaporation chamber and the hopper.

With reference to FIGS. 4–7, more detailed drawings of alternative embodiments of evaporator 20 (FIGS. 1 and 2) are shown. Each of the embodiments provides for an evaporator with a primary evaporator chamber and a secondary evaporator chamber. The secondary evaporator chamber is used to advantageously maintain the interior chamber at an appropriate cooling temperature. In FIGS. 4-7, reference numerals having the same last two digits are substantially similar unless otherwise noted.

Figure 4:
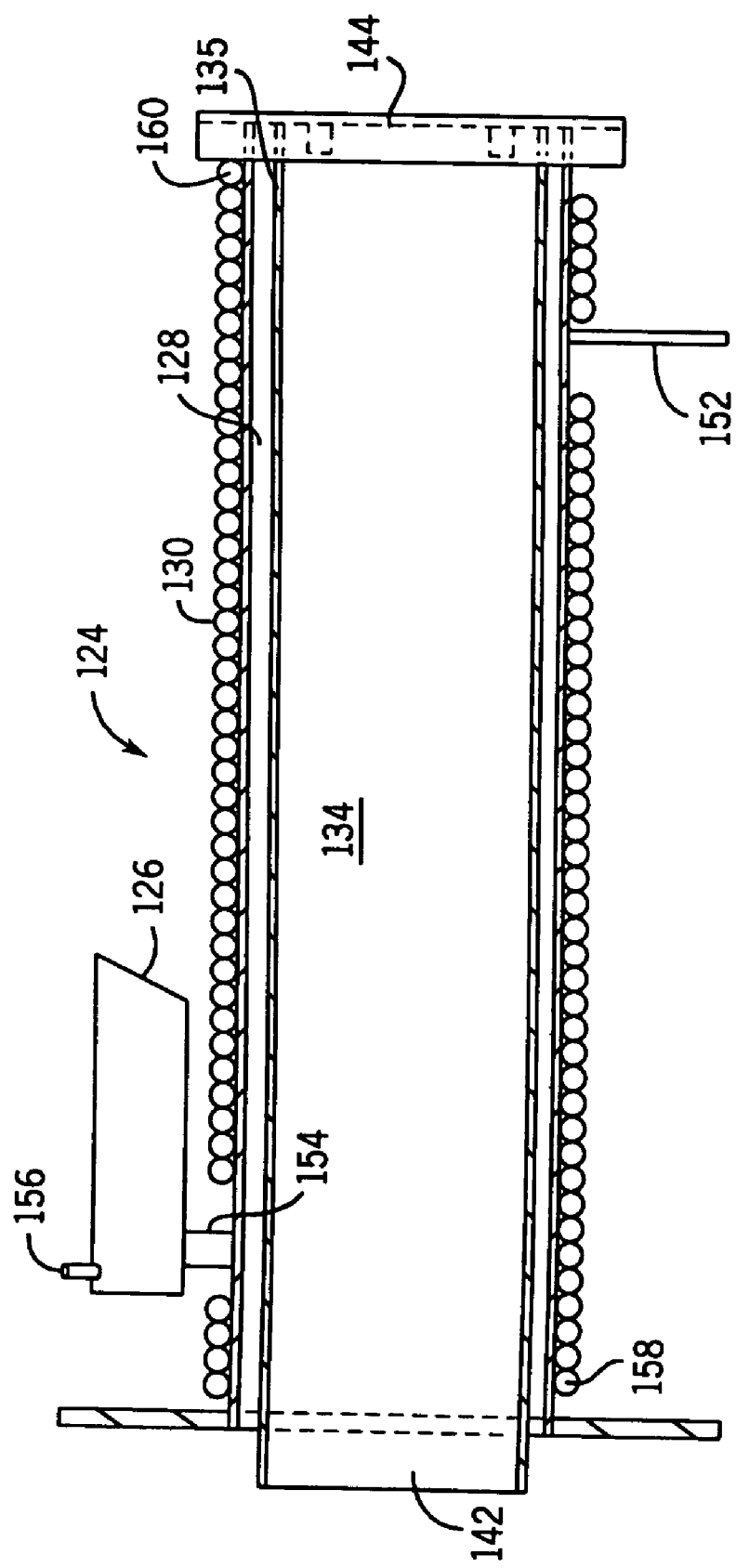
FIG. 4 is a more detailed side cross-sectional view of an evaporator for use in the systems illustrated in FIGS. 1 and 2.

With reference to FIG. 4, an evaporator 124 includes an auxiliary evaporator tank 126, a primary evaporator chamber 128, and a secondary evaporator 130. Primary evaporator chamber 128 is provided about an interior cooling chamber 134 which can include an auger such as auger 56 (FIG. 1). Chamber 134 can be defined by a 0.125 inch thick stainless steel tube 135 having exemplary dimensions of a 4 inch outer diameter. Chamber 128 can be defined by a stainless steel tube 129 having exemplary dimensions of an inner diameter of 4.5 inches and a length of 18 inches–20.5 long.

Chamber 134 includes a liquid ice cream input 142 which can be controlled by a valve and an ice cream output 144 which can be controlled by a gate. Preferably, chamber 134 has a volume of approximately 226 cubic inches.

Evaporator chamber 128 includes a refrigerant input 152 corresponding to refrigerant input 40 and a refrigerant output 154 corresponding to refrigerant output 42 (FIGS. 1 and 2). Preferably, evaporator chamber 128 has a volume of approximately 60 cubic inches (e.g., length of 18 inches and a jacket width of 0.25 inches).

Auxiliary tank 126 includes a refrigerant output 156 which can be coupled to refrigeration system 12. Tank 126 operates as an accumulator similar to the accumulator described in U.S. Pat. Nos. 6,119,472 and 5,755,106. Tank 126 should not be confused with secondary evaporator 130 which operates in parallel with evaporator chamber 128, rather than in series with chamber 128 as tank 126 operates. Secondary evaporator 130 includes a refrigerant input 158 corresponding to refrigerant input 41 (FIGS. 1 and 2) and a refrigerant output 160 corresponding to refrigerant output 43. Preferably, secondary evaporator 130 is comprised of copper tubing wrapped completely around the barrel associated with evaporator chamber 128.

The tubing associated with secondary evaporator 130 can be ⅜ copper tubing. The tubing is closely wrapped in a single layer from end-to-end of evaporator chamber 128. Alternatively, other wrapping configurations and tubing materials and sizes can be utilized. Evaporator 130 can include two or more layers of tubing.

Figure 5:
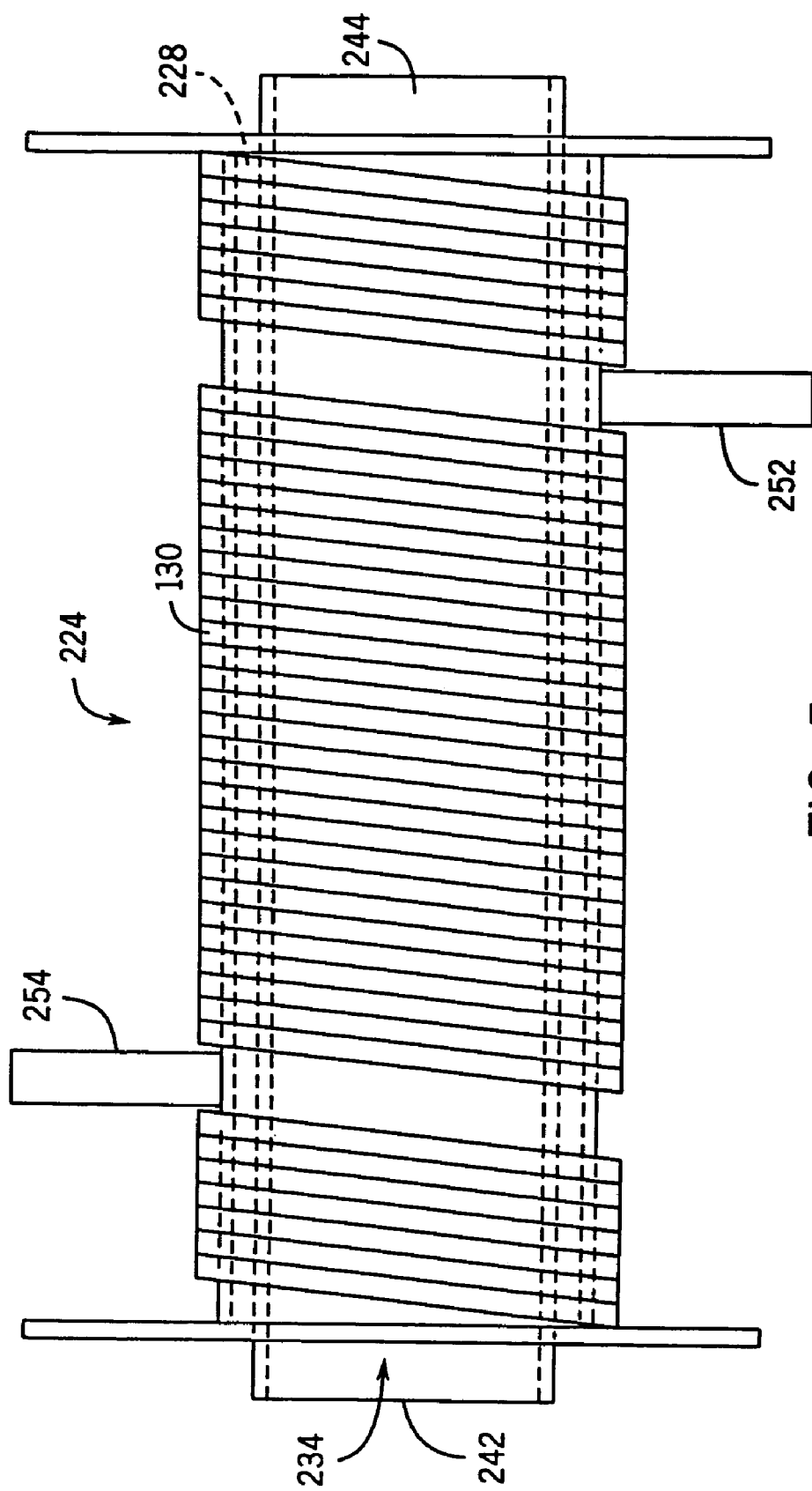
FIG. 5 is a more detailed side planar view of an alternative evaporator for use in the systems illustrated in FIGS. 1 and 2.

With reference to FIG. 5, an evaporator 224 is substantially similar to evaporator 124 including a refrigerant input 252 and a refrigerant output 254. Output 254 can be coupled to system 12 (FIG. 1) or system 112 (FIG. 2). Evaporator 224 does not include an auxiliary evaporator tank such as evaporator tank 126 in FIG. 4.

Figure 6:
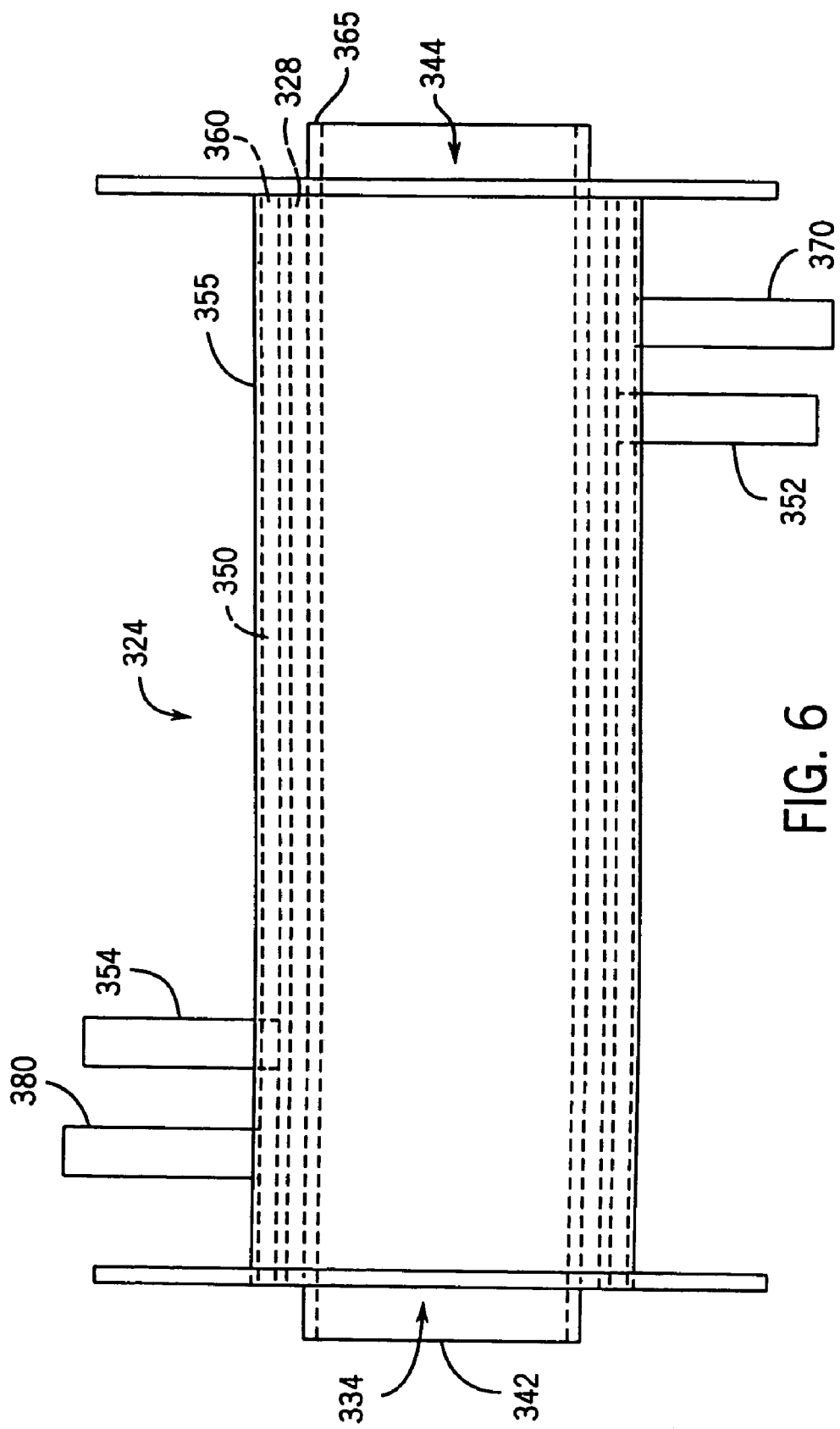
FIG. 6 is a more detailed side planar view of an alternative evaporator for use in the systems illustrated in FIGS. 1 and 2.

With reference to FIG. 6, evaporator 324 includes a secondary evaporator 350. Secondary evaporator 350 is defined by an outer barrel 355, and an inner barrel 360. A primary evaporator chamber 328 is defined by an intermediate barrel 360 and an inner barrel 365. Secondary evaporator 350 includes a refrigerant input 370 and a refrigerant output 380. Evaporator 324 can also include an auxiliary evaporator tank such as tank 126 (FIG. 4). Inner barrel 365 defines interior cooling chamber 334. In a preferred embodiment, inner barrel 365 has an outer diameter of 4 inches and a length of 18 inches. Barrel 360 has an outer diameter of 4.76 inches and a length of 18 inches, and barrel 355 has an outer diameter of 5.25 inches and a length of 18 inches. Barrels 355, 360, and 365 can be 0.125 inches thick and manufactured from stainless steel.

Figure 7:
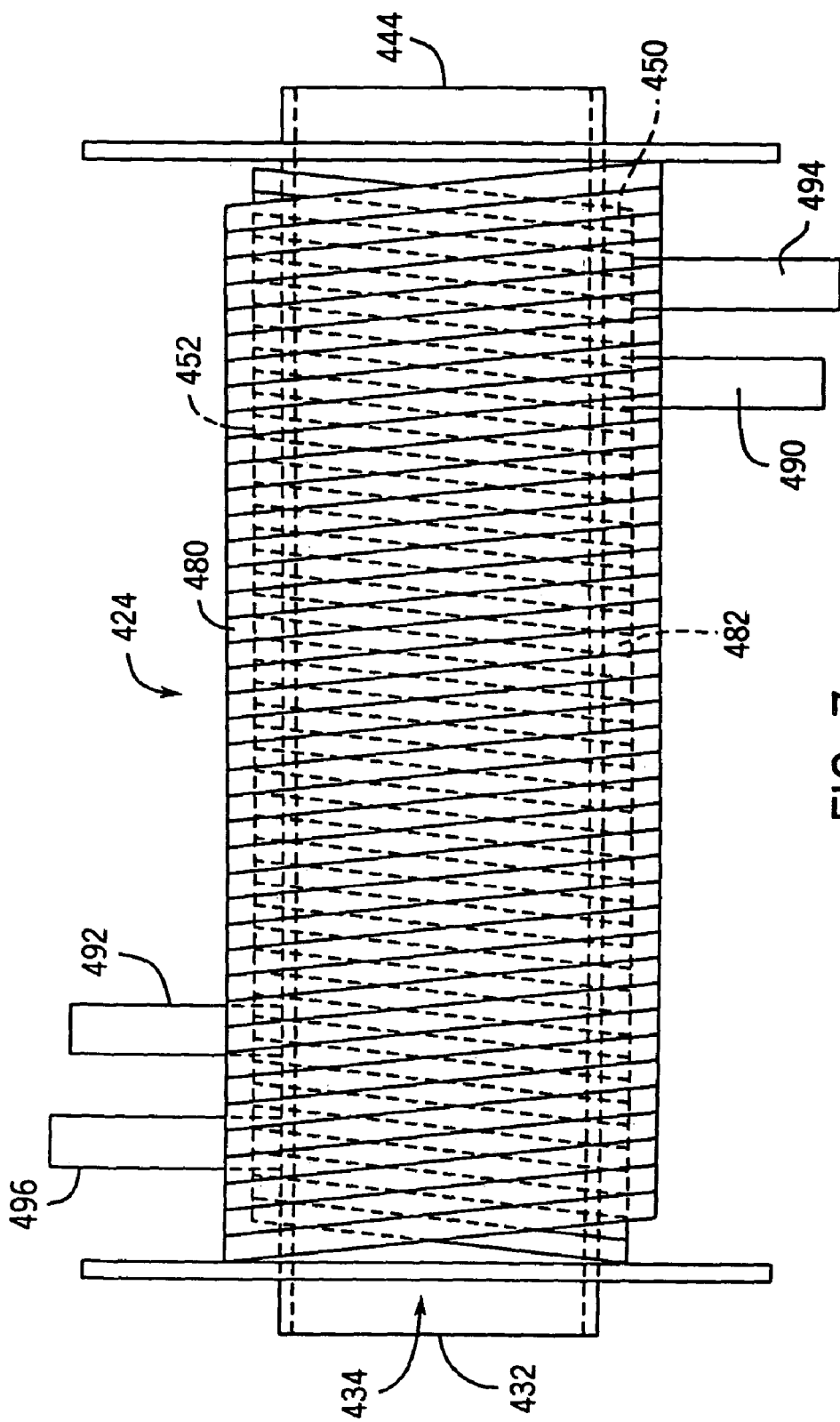
FIG. 7 is more detailed side planar view of an alternative evaporator for use in the systems illustrated in FIGS. 1 and 2.

With reference to FIG. 7, evaporator 424 includes secondary evaporator 452 including a double wrap of copper tubes. A first wrap 480 is provided about a second wrap 482. Second wrap 482 is provided about evaporator chamber 450. Chamber 450 includes a refrigerant input and a refrigerant to output similar to refrigerant input 352 and 354 (FIG. 6). Wraps 480 and 482 are provided from end-to-end of chamber 450.

Second wrap 482 includes a refrigerant input 490 and a refrigerant output 492. First wrap 480 includes a refrigerant input 494 and a refrigerant output 496. Refrigerant input 490 and refrigerant output 492 can be coupled to a separate refrigeration system than that used for wrap 480 and chamber 450. Similarly, refrigerant input 494 and output 496 can be utilized with a different compressor or refrigeration system than that used for wrap 482 and chamber 450. Preferably, wraps 480 and 482 are provided on top of each other.

Figure 8:
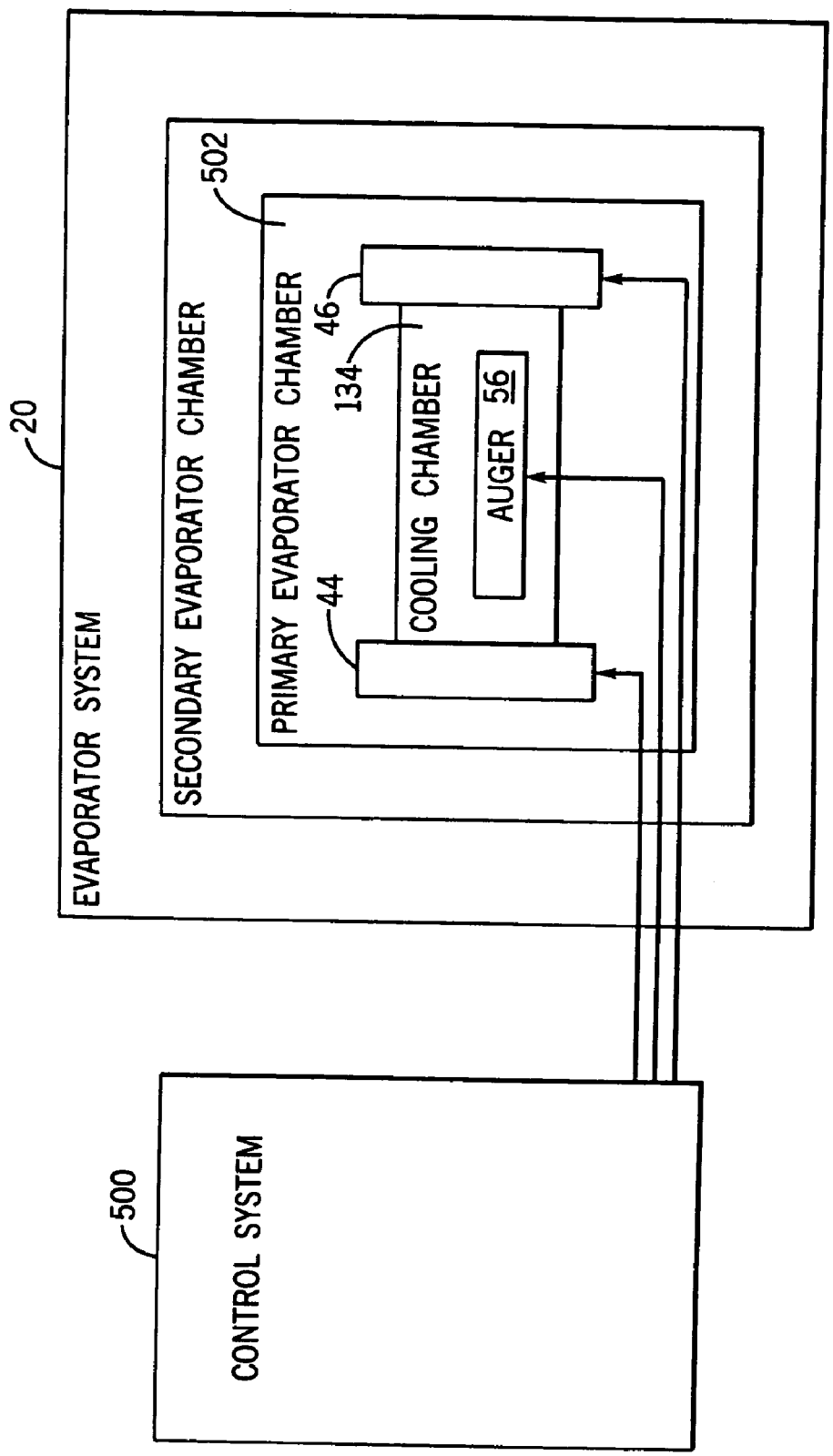
FIG. 8 is a general block diagram of a gate, valve and auger control system for the ice cream machine systems illustrated in FIGS. 1 and 2.

With reference to FIG. 8, a control system 500 is provided to more accurately control the temperature and consistency of product within interior chamber 134 during non-production mode 62. For example, control system 500 can include electronics or mechanical devices to ensure that valve 54 is open and closed simultaneously with gate 52. Alternatively, a delay can be utilized between opening and closing gate 52 with respect to valve 54.

Auger 56 is controlled by control system 500 to ensure auger 56 stops when the interior cooling chamber within evaporator 20 reaches an appropriate temperature. By sensing the amperage being provided through the motor associated with auger 56, the consistency of the contents within interior chamber 134 can be determined. The consistency can represent the appropriate temperature associated with the contents in evaporator 20. When the amperage is at the appropriate level, control system 500 can turn off the motor which drives auger 56, thereby preventing overbeating of the contents in evaporator 20.

Once gate 52 is opened, the motor can be reset and allowed to run until gate 52 is closed. After gate 52 is closed, the motor will continue to run until current sensed through the motor indicates that the appropriate temperature in interior chamber 134 is reached. Alternatively, control schemes can be utilized to stop auger 56 appropriately. For example, system 500 can utilize a temperature sensor situated in chamber 502 or chamber 134. Preferably, control system 500 includes a micro switch or other device for sensing when gate 46 is opened to re-engage the motor which drives auger 56.

With reference to FIG. 9, the various modes associated with systems 10 and 100 described with references to FIGS. 1 and 2 are discussed. In a first mode, or production mode 602, manufacture of an ice cream product can begin. Generally, the production mode operates auger 56 and uses a primary evaporator associated with refrigeration input 40 and refrigeration output 42. An operator can open gate 46 and remove ice cream from evaporator 20 in an operational mode 604. When gate 52 is open, valve 54 is open, thereby allowing liquid ice cream into evaporator 20. After gate 46 is closed and valve 44 is closed, system 10 can enter a non-production mode 606.

Non-production mode 606 can occur once the temperature within evaporator 20 reaches a particular temperature. In mode 606, the primary evaporator and auger are utilized. Similarly, as ice cream is removed, the auger and primary evaporator are utilized. In mode 606, the secondary evaporator is utilized and the auger is stopped to prevent overbeating of the ice cream.

The term "coupled", as used in the present application, does not necessarily mean directly attached or connected. Rather, the term "coupled" in the present application means in fluid or electrical communication there with. Two components may be coupled together through intermediate devices. For example, the evaporator input is coupled to the condenser output even though the expansion valve, accumulator/heat exchanger, and sight glass are situated between the evaporator input and the condenser output.

It is understood that, while the detailed drawings and specific examples given to describe the preferred exemplary embodiment of the present invention, they are for the purpose of illustration only. The apparatus of the invention is not limited to the precise details and conditions disclosed. For example, although food stuffs and ice cream are mentioned, the invention may be utilized in a variety of refrigeration or cooling systems. Further, single lines for carrying liquid refrigerant can represent multiple tubes. Additionally, although a particular valve, accumulator, compressor, condenser, and filter configuration is shown, the advantageous machine can be arranged in other configurations. Further still, the evaporator barrel and freezer can have any number of shapes, volumes, or sizes. Various changes can be made to the details disclosed without departing from the spirit of the invention, which is defined by the following claims.

What is claimed is:

1. An ice cream making system, comprising:
   an evaporator including a cooling chamber, the cooling chamber having an ice cream input and an ice cream output, wherein liquid ice cream is provided at the ice cream input and frozen ice cream is provided at the ice cream output wherein the evaporator includes a first evaporator chamber and a second evaporator chamber, wherein refrigerant travels from the first chamber to the second chamber, the second chamber ensuring the first chamber being flooded with the refrigerant;
   a gate at the ice cream output;
   at least one valve at the ice cream input, the valve allowing the liquid ice cream to enter the cooling chamber and the valve preventing the liquid ice cream from entering the cooling chamber, the valve including a control input; and
   a control system coupled to the control input the control system ensuring that the valve is closed when the gate is closed, wherein the valve is controlled to ensure that the cooling chamber is not more than 50 percent filled when the gate is closed.

2. The ice cream making system of claim 1, wherein the control system controls the valve to prevent the cooling chamber from being more than or equal to 50 percent filled.

3. The ice cream making system of claim 2, wherein the valve is controlled to maintain the cooling chamber filled to 25–50 percent.

4. The ice cream making system of claim 1, wherein the valve and the gate are operably linked to open and close in coordination.

5. The ice cream making system of claim 1, wherein the gate and the valve are controlled so that the valve is opened when the gate is opened.

6. The ice cream making system of claim 5, wherein the valve is maintained opened after the gate is opened until an appropriate level of the liquid ice cream enters the cooling chamber.

7. An ice cream making system, comprising:
   an evaporator including a cooling chamber, the cooling chamber having an ice cream input and an ice cream output, wherein liquid ice cream is provided at the ice cream input and frozen ice cream is provided at the ice cream output;
   a gate at the ice cream output;
   at least one valve at the ice cream input, the valve allowing the liquid ice cream to enter the cooling chamber and the valve preventing the liquid ice cream from entering the cooling chamber, the valve including a control input;
   a control system coupled to the control input, the control system ensuring that the valve is closed when the gate is closed, wherein the valve is controlled to ensure that the cooling chamber is no more than 75 percent filled when the gate is closed; and
   wherein the evaporator includes a primary evaporator chamber and a secondary evaporator chamber, the primary evaporator chamber being provided about the cooling chamber and the secondary evaporator chamber being provided about the primary evaporator chamber.

8. An ice cream making system, comprising:
   an evaporator including a cooling chamber, the cooling chamber having an ice cream input and an ice cream output, wherein liquid ice cream is provided at the ice cream input and frozen ice cream is provided at the ice cream output;

a gate at the ice cream output;
at least one valve at the ice cream input, the valve allowing the liquid ice cream to enter the cooling chamber and the valve preventing the liquid ice cream from entering the cooling chamber, the valve including a control input;
a control system coupled to the control input, the control system ensuring that the valve is closed when the gate is closed, wherein the valve is controlled to ensure that the cooling chamber is no more than 75 percent filled when the gate is closed; and
wherein the evaporator further includes a primary evaporator chamber about the cooling chamber and a copper tube provided about the primary evaporator chamber, the copper tube having a first end associated with a second refrigerant input and a second end associated with a second refrigerant output.

9. The evaporator of claim 8, wherein the valve is controlled to ensure that the cooling chamber is 50 percent or less filled.

10. The evaporator of claim 7, wherein the valve is controlled to ensure that the cooling chamber is less than 50 percent filled.

11. The evaporator of claim 10, wherein the primary evaporator chamber is defined by a space between a first cylinder and a second cylinder, the second cylinder being about the first cylinder.

12. An evaporator for an ice cream making system, the evaporator comprising:
an interior surface defining a cooling chamber for chilling a product, the cooling chamber having an ice cream input and an ice cream output;
a two stage evaporator chamber surrounding the cooling chamber, the two stage evaporator including a first stage and a second stage, the second stage acting to cool refrigerant in the first stage; and
a valve in series with the ice cream input, the valve being controlled to ensure that the cooling chamber is less than or equal to 50 percent filled.

13. The evaporator of claim 12, wherein the valve is a metering valve.

14. An evaporator for an ice cream making system, the evaporator comprising:
a cooling chamber for chilling a product, the cooling chamber having an ice cream input and an ice cream output;
an evaporator chamber surrounding the cooling chamber;
an electrical control circuit electrically coupled to the valve;
a valve in series with the ice cream input, the valve being controlled to ensure that the cooling chamber is 50 percent or less filled; and
an auxiliary evaporator for collecting vapor refrigerant exiting the evaporator chamber wherein the cooling chamber is defined by a first cylinder and the evaporator chamber is defined by a space between the first cylinder and a second cylinder, the second cylinder being about the first cylinder, wherein the auxiliary evaporator is a chamber defined byte second cylinder and a third cylinder, the third cylinder being about the second cylinder.

15. The evaporator of claim 14, further comprising an auxiliary evaporator tank coupled to the evaporator chamber.

16. A method of manufacturing ice cream, the method utilizing an ice cream machine having a cooling chamber, the method comprising:
providing liquid ice cream contents into the cooling chamber through a valve, the valve preventing the cooling chamber from being more than or equal to 50 percent filled when ice cream is not removed from the cooling chamber;
cooling the liquid ice cream contents in the cooling chamber using a primary evaporator chamber and another evaporator chamber; and
removing frozen ice cream from the cooling chamber.

17. The method of claim 16, wherein the valve is controlled by an electric control circuit.

18. The method of claim 16, wherein the frozen ice cream is removed through a gate, the gate being opened and closed in coordination with the valve allowing liquid ice cream contents into the cooling chamber.

19. A method of manufacturing ice cream, the method utilizing an ice cream machine having a cooling chamber, the method comprising:
providing liquid ice cream contents into the cooling chamber through a valve, the valve preventing the cooling chamber from being more than 75 percent filled when ice cream is not removed from the cooling chamber;
cooling the liquid ice cream contents in the cooling chamber;
removing frozen ice cream from the cooling chamber; and
wherein the ice cream maker further comprises a secondary evaporator about a primary evaporator about the cooling chamber, wherein the secondary evaporator is a coiled tube.

20. A method of manufacturing ice cream, the method utilizing an ice cream machine having a cooling chamber, the method comprising:
providing liquid ice cream contents into the cooling chamber trough a valve, the valve preventing the cooling chamber from being more than 75 percent filled when ice cream is not removed from the cooling chamber;
cooling the liquid ice cream contents in the cooling chamber;
removing frozen ice cream from the cooling chamber; and
wherein the ice cream maker further comprises a secondary evaporator about a primary evaporator about the cooling chamber, wherein the secondary evaporator surrounds the primary evaporator.

21. An ice cream making system, comprising:
an evaporator including a cooling chamber, the cooling chamber having an ice cream input and an ice cream output, the evaporator including a primary evaporator and a secondary evaporator;
a means for restricting access through the ice cream input to the cooling chamber; and
a means for controlling the means for restricting so that the cooling chamber is less than or equal to 50 percent filled when ice cream is not exiting the cooling chamber.

* * * * *

UNITED STATES PATENT AND TRADEMARK OFFICE
CERTIFICATE OF CORRECTION

PATENT NO. : 6,988,372 B2  Page 1 of 1
DATED : January 24, 2006
INVENTOR(S) : Harold F. Ross and Daniel L. Dorn It is certified that error appears in the above-identified patent and that said Letters Patent is hereby corrected as shown below:

<u>Column 11,</u>
Line 59, delete "byte" and insert -- by the --.

<u>Column 12,</u>
Line 40, delete "trough" and insert -- through --.

Signed and Sealed this

Fourth Day of April, 2006

JON W. DUDAS
*Director of the United States Patent and Trademark Office*